United States Patent [19]

Qureshi

[11] Patent Number: 4,686,250

[45] Date of Patent: Aug. 11, 1987

[54] MOISTURE RESISTANT, WET WINDING EPOXY RESIN SYSTEM CONTAINING AROMATIC DIAMINES

[75] Inventor: Shahid P. Qureshi, Piscataway, N.J.

[73] Assignee: Amoco Corporation, Chicago, Ill.

[21] Appl. No.: 813,840

[22] Filed: Dec. 27, 1985

[51] Int. Cl.$^4$ .................... C08L 63/00; C08G 59/50
[52] U.S. Cl. .................................. 523/440; 523/445; 523/457; 523/458; 523/466; 523/468; 525/423; 528/98; 528/99; 528/220; 528/361; 528/373; 528/407
[58] Field of Search ............ 528/98, 99, 220, 373, 528/407, 361; 523/440, 445, 468, 466, 457, 458; 525/423

[56] References Cited

U.S. PATENT DOCUMENTS

| | | | |
|---|---|---|---|
| 3,368,983 | 2/1968 | Tinsley et al. | 528/407 X |
| 4,222,962 | 9/1980 | Pellegrini, Jr. | 260/571 |
| 4,567,216 | 1/1986 | Qureshi et al. | 523/400 |
| 4,579,885 | 4/1986 | Domeier et al. | 528/98 X |

*Primary Examiner*—Earl Nielsen
*Attorney, Agent, or Firm*—Richard J. Schlott; William H. Magidson; Ralph C. Medhurst

[57] ABSTRACT

Curable thermosetting resin compositions comprising at least one cycloaliphatic epoxy resin having at least two 1,2-epoxy groups per molecule, and certain aromatic diamines having three aromatic rings in the molecule are disclosed. Resin compositions comprised of, for example, bis(2,3-epoxycyclopentyl)ether and 1,3-bis(4-aminophenoxy)benzene exhibit a highly desirable balance of physical and chemical properties which renders such compositions ideally suited for use in the fabrication of wet winding composites. The resin compositions prepared in accordance with the invention have unexpectedly low viscosity, high glass transition temperatures, high tensile properties and unexpectedly low water uptake. Accordingly, the resin compositions find particular application in the preparation of composites by wet winding procedures.

22 Claims, No Drawings

MOISTURE RESISTANT, WET WINDING EPOXY RESIN SYSTEM CONTAINING AROMATIC DIAMINES

FIELD OF THE INVENTION

This invention relates in general to novel epoxy resin systems. In one aspect, this invention is directed to moisture resistant, wet winding epoxy resin systems containing certain aromatic diamines, such as 1,3-bis(4-aminophenoxy)benzene and 4,4'-(1,3-phenylene)bis(1-methylethylidene). In a further aspect, the present invention relates to compositions comprised of cycloaliphatic epoxy resins and aromatic diamines having three aromatic rings in the molecule which are characterized by low room temperature viscosity and hence, ideally suited for making composites by the wet winding process. The compositions of this invention are further characterized by high glass transition temperatures, low moisture uptake and good mechanical properties.

BACKGROUND OF THE INVENTION

The three dimensional epoxy-amine network produced by the curing of amine/epoxy resin formulations is well known to exhibit desirable mechanical, chemical, thermal and other properties. As a result, amine curable epoxy resins systems have been widely used as coatings, adhesives, sealants and matrices for fiber-reinforced composites. Epoxy resin systems are also particularly useful in the preparation of composite articles by wet filament winding techniques. In many instances, however, it is not always possible to prepare articles by wet filament winding wherein the starting liquid in which the filaments are coated is of sufficiently low viscosity for use in presently available coating equipment, and yet which results in a finished, cured product having the optimum desired properties. In many instances, the viscosity of the resin solution must be adjusted by the addition of diluents which adversely effect the thermal and mechanical properties of the resulting product.

For example, in U.S. Pat. No. 4,517,321 which issued May 14, 1985 high strength, high modulus materials are disclosed which have low water uptake properties but are not suitable for wet filament winding techniques due to their high viscosities. In this patent the compositions disclosed are comprised of an epoxy resin containing two or more 1,2-epoxide groups per molecule, a structural fiber and a diamine hardener. The diamine hardeners which are disclosed as being useful in preparing the compositions of the invention are characterized by the presence of four aromatic rings in the diamine molecule and which are separated from each other by divalent groups such as oxygen, sulfur, sulfur dioxide, carbonyl, ester and like groups. However, as indicated, the resin systems disclosed are not adequate for use in preparing composite articles by wet filament winding techniques due to their high viscosities at ambient temperature. Accordingly, there is a need for a resin system which has the desired viscosity for wet winding procedures without the need for diluents and which also results in cured products having the desired characteristics for a particular application.

It has now been found that by using a resin system as hereinafter described, articles can be prepared by the wet winding process and which also result in cured systems having optimum physical and other properties.

SUMMARY OF THE INVENTION

The present invention is directed to curable, thermosetting epoxy compositions comprising:

(a) at least one cycloaliphatic epoxy resin containing at least two 1,2-epoxy groups per molecule;

(b) at least one aromatic diamine hardener in an amount, sufficient to provide from about 0.4 to about 2.0 equivalents of amine N—H per equivalent of 1,2-epoxy groups in the epoxy resin; and having the following formula:

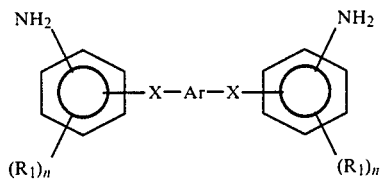

wherein Ar represents a single or fused aromatic nucleus, preferably a hydrocarbon aromatic nucleus of up to 10 carbon atoms, which may optionally contain one or more R and $R_1$ substituents; X represents O, or a single bond; R and $R_1$ individually represent alkyl or halogen groups; $R_2$ represents hydrogen or an alkyl group of from 1-12 carbon atoms and n has a value of from 0 to 4. Preferred diamines are those wherein Ar represents a substituted or unsubstituted meta- or paraphenylene group and R and $R_1$ represent lower alkyl groups of from 1 to 4 carbon atoms or halogen, preferably bromine and chlorine, and $R_2$ is hydrogen methyl; and (c) a structural fiber, as hereinafter defined. Optionally, the compositions of this invention may also contain a catalyst to enhance polymerization, and/or modifiers to increase the modulus of the cured epoxy resin, and/or thermoplastic materials.

The compositions of this invention containing components (a) and (b) afford low viscosity at room temperature, that is, a maximum of 2000 cps at 25° C., which is appropriate for making composites with component (c) by the wet winding process. The unreinforced castings based on components (a) and (b) display lower moisture uptake than other low viscosity systems based on conventional hardeners such as metaphenylenediamine (MPDA) or methylenedianiline (MDA). The compositions of this invention also demonstrate high Tg's and excellent tensil properties.

DETAILED DESCRIPTION OF THE INVENTION

As hereinbefore indicated the present invention is directed to systems which are particularly useful for the fabrication of composites by the wet winding process.

The compositions of this invention employ aromatic diamine hardeners of the following formula:

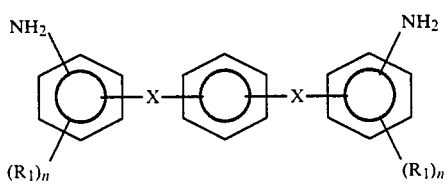

wherein X=O,

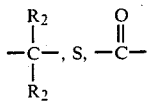

or a single bond, R and $R_1$ individually represent alkyl of from 1-12 carbon atoms or halogen groups, $R_2$ represents hydrogen or an alkyl group of from 1-12 carbon atoms and n has a value of from 0 to 4.

The preferred amines which are employed as the diamine hardener of the present invention include, among others, 1,3-bis(4-aminophenoxy)benzene "TPE-R," 1,3-bis(3-aminophenoxy)benzene "TPE-M," alpha, alpha-bis(4-aminophenyl)-para-diisopropylbenzene "Bisaniline-M," 1,3-bis(m-aminobenzoyl)benzene "AMB," and 1,3-bis(m-amino-phenyl)benzene "APB." These diamines have melting points lower than 165° C. and display good solubility in epoxy resins.

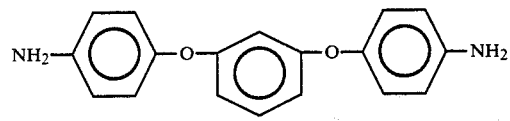

(TPE-R)

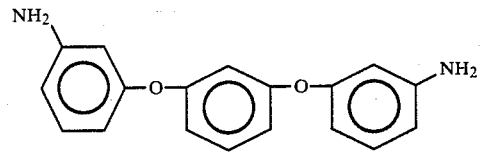

(TPE-M)

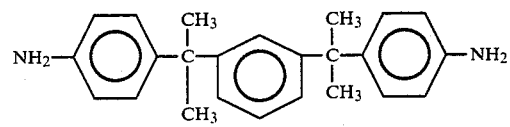

(Bisaniline-M)

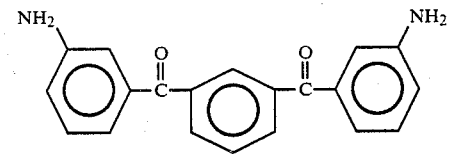

(AMB)

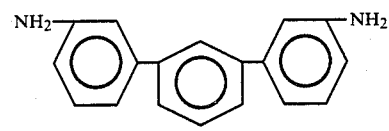

(APB)

The aromatic diamines as defined above, are employed as the sole diamine hardener in the resin systems of the present invention. Although other diamines can be used in conjunction with these aromatic diamines, they are, for the most part, not employed since the resin systems would not have the desired low viscosity, nor provide castings and composites having the low moisture uptake and other desirable properties.

In addition to the various advantages previously noted, the compositions of this invention have good stability at room temperature, i.e., the diamine and the epoxy resin blend shows small increase in viscosity at room temperature up to 2 days which allows sufficient time for processing. This characteristic greatly facilitates handling in the production of composite articles by the wet winding process.

As a result of the foregoing advantages, the present invention thus provides composites which comprise the compositions defined above containing structural fibers having a tensile strength of greater than about 100,000 psi, a tensile modulus of greater than about two million psi, and a decomposition temperature of greater than about 200° C.

Other embodiments, features and advantages of this invention will become apparent to those skilled in the art upon examination of the following detailed description of the invention.

The diamine hardeners of this invention may be prepared by one or more methods disclosed in the literature. For example, one general route for preparing the diamines involves the reaction of alpha, alpha' dihydroxy-para-diisopropylbenzene with aniline in the presence of an acidic alumina catalyst and heating the mixture to 160°-220° C. to give alpha, alpha'-bis(4-aminophenyl)-para-diisopropylbenzene. Details of the method are reported by H. J. Buysch et al. in German Often. No. De 2,111,194 published Sept. 14, 1972. A similar method is also disclosed for the preparation of substituted aminoaryl compounds and derivatives in Netherlands patent application No. 6,408,539 of Jan. 20, 1965 by Allied Chemical Corp.

Another general method which can also be employed for the preparation of the diamine starting materials involves the reaction of a diisopropenylbenzene with an aniline hydrochloride under a nitrogen atmosphere and at temperatures of from 180°-200° C. as disclosed in U.S. Pat. No. 3,206,152 assigned to Farbenfabriken Bayer, A. G. A further method for preparing the diamines starting from diisopropenylbenzene is disclosed in U.S. Pat. No. 3,365,347 which issued Jan. 23, 1968 to Allied Chemical Corp.

Certain of the diamine hardeners are available commercially, such as for example, alpha, alpha'-bis(4-aminophenyl)-meta-diisopropylbenzene and alpha, alpha'-bis(4-aminophenyl)-para-diisopropylbenzene which can be obtained from Mitsui Petrochemicals Industries Ltd, Japan having an office at 200 Park Avenue, New York, N.Y. 10017. Additionally, the diamine hardeners 1,3-bis(4-aminophenyl)benzene and 1,3-bis-(3-aminophenoxy)benzene are available from Wakayama Seika, Japan. The preparation of others aromatic diamines are described in U.S. Pat. No. 4,222,962 which issued Sept. 16, 1980 to J. P. Pellegrini, Jr.

The cycloaliphatic epoxy resins used in the composition of this invention are those prepared by opoxidation of dienes or polyenes. Resins of this type include bis(2,3-epoxycylopentyl)ether, I;

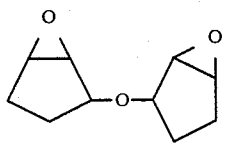

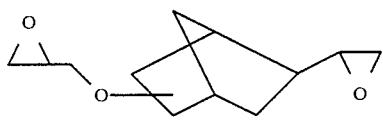

copolymers of I with ethylene glycol which are described in U.S. Pat. No. 3,398,102, 5(6)-glycidyl-2-(1,2-epoxyethyl)bicyclo[2.2.1]heptane, II; and dicyclopentadiene diepoxide. Commercial examples of these types of epoxides include vinylcyclohexene dioxide, e.g., "ERL-4206" (obtained from Union Carbide Corp.), 3,4-epoxycyclohexylmethyl 3,4-epoxycyclohexane carboxylate, e.g., "ERL-4221" (obtained from Union Carbide Corp.), 3,4-epoxy-6-methylcyclohexylmethyl 3,4-epoxy-6-methylcyclohexane carboxylate, e.g., "ERL-4201" (obtained from Union Carbide Corp.), bis(3,4-epoxy-6-methylcyclohexylmethyl)adipate, e.g., "ERL-4289" (obtained from Union Carbide Corp.), dipentene dioxide, e.g., "ERL-4269" (obtained from Union Carbide Corp.) 2-(3,4-epoxycyclohexyl-5,5-spiro-3,4-epoxy)cyclohexane meta-dioxane, e.g., "ERL-4234" (obtained from Union Carbide Corp.) and epoxidized polybutadiene, e.g., "Oxiron 2001" (obtained from FMC Corp.).

Other suitable cycloaliphatic epoxides include those described in U.S. Pat. Nos. 2,750,395; 2,890,194; and 3,318,822 which are incorporated herein by reference, and the following:

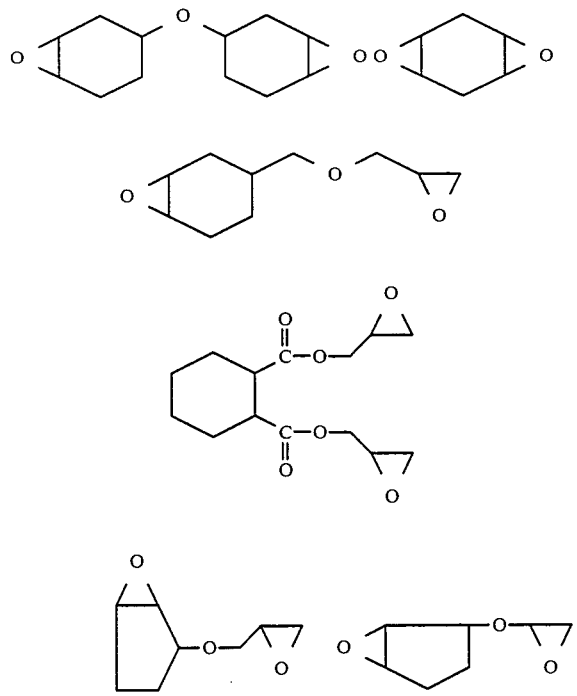

Other suitable epoxides include:

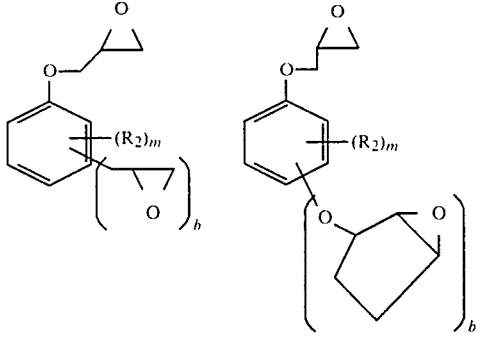

where b is 1 to 4, m is (5-b), and $R_2$ is H, halogen, or $C_1$ to $C_4$ alkyl.

The preferred epoxy resins, comprise bis(2,3-epoxycyclopentyl)ether, vinyl cyclohexene diepoxide, 2-(3,4-epoxycyclohexyl-5,5-spiro-3,4-epoxy (cyclohexane meta-dioxane, the diepoxides of allyl cyclopentenyl ether, 1,4-cyclohexadiene diepoxide, 3,4-epoxycyclohexylmethyl 3,4-epoxy-cyclohexane carboxylate, and bis(3,4-epoxycyclohexylmethyl)adipate, of which bis-(2,3-epoxy-cyclopentyl)ether and 3,4-epoxycyclohexylmethyl 3,4-epoxycyclohexane carboxylate are particularly preferred.

The composition of this invention may contain a coepoxide in an amount up to about 30% by weight based on total epoxy content. The coepoxides include polyglycidyl compounds containing a plurality of 1,2-epoxide groups derived from the reaction of a polyfunctional active hydrogen-containing compound with an excess of an epihalohydrin under basic conditions. When the active hydrogen compound is a polyhydric alcohol or phenol, the resulting epoxide composition contains glycidyl ether groups. A preferred group of polyglycidyl compounds are made via condensation reactions with 2,2-bis(4-hydroxyphenyl)propane, also known as bisphenol A, and have structures as follows:

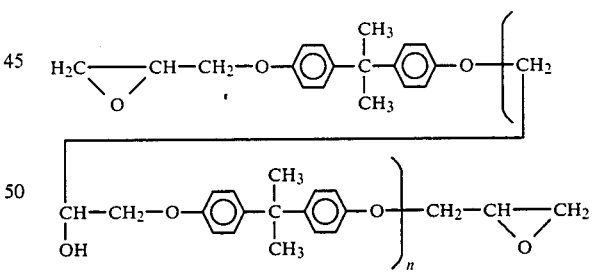

where n has a value from about 0 to about 15. These epoxides are bisphenol-A epoxy resins. They are available commercially under the trade names such as "Epon 828," "Epon 1001", and "Epon 1009", from Shell Chemical Co. and as "D.E.R 331", "D.E.R 332", and "D.E.R 334" from Dow Chemical Co. The most preferred bisphenol A epoxy resins have an "n" value between 0 and 10.

Polyepoxides which are polyglycidyl ethers of 4,4'-dihydroxydiphenyl methane, 4,4'-dihydroxydiphenyl sulfone, 4,4'-biphenol, 4,4'-dihydroxydiphenyl sulfide, phenolphthalein, resorcinol, 4,2'-biphenol, or tris(4-hydroxyphenyl)methane, such as Tactix 742 from Dow Chemical Company, and the like, are useful in this invention. In addition, Epon 1-31 (a tetraglycidyl derivative of 1,1,2,2-tetrakis(hydroxyphenyl)ethane (obtained from Shell Chemical Company), and Apogen 101, (a methylolated bisphenol phenol A resin obtained from Schaefer Chemical Co.) may also be used Halogenated polyglycidyl compounds such as D.E.R. 580 (a brominated bisphenol A epoxy resin obtained from Dow Chemical Company) are also useful. Other suitable epoxy resins include polyepoxides prepared from polyols such as pentaerythritol, glycerol, butanediol or trimethylolpropane and an epihalohydrin.

Polyglycidyl derivatives of phenolformaldehyde novolaks and cresol-formaldehyde novolaks are also usable.

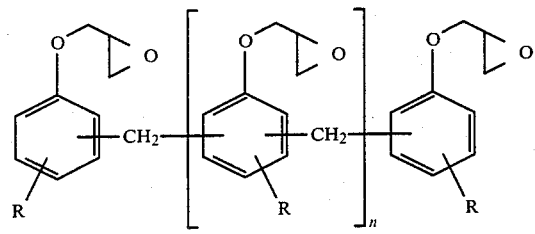

wherein
R=H
R=CH$_2$
n=0.1 to 8.

The former are commercially available as D.E.N. 431, D.E.N. 438, and D.E.N. 485 (obtained from Dow Chemical Company). The latter are available as, for example, ECN 1235, ECN 1273, and ECN 1299 (obtained from Ciba Geigy Corporation, Ardsley, NY). Epoxidized novolaks made from bisphenol A and formaldehyde such as SU-8 (obtained from Celanese Polymer Specialties Company, Louisville, KY) are also suitable.

Other polyfunctional active hydrogen compounds besides phenols and alcohols may be used to prepare the polyglycidyl adducts of this invention. These include amines, aminoalcohols and polycarboxylic acids.

Adducts derived from amines include N,N-diglycidyl aniline, N,N-diglycidyl toluidine, N,N,N',N'-tetraglycidylxylylene diamine, N,N,N,N',N'-tetraglycidyl-bis(methylamino)-cyclohexane, N,N,N',N'-tetraglycidyl-4,4'-di-aminodiphenyl methane, N,N,N',N'-tetraglycidyl-3,3'-diaminodiphenyl sulfone, and N,N'-dmethyl-N,N'-diglycidyl-4,4'-diaminodiphenyl methane. Commercially available resins of this type include Glyamine 135 and Glyamine 125 (obtained from F.I.C. Corporation, San Francisco, CA.), Araldite MY-720 (obtained from Ciba Geigy Corporation) and PGA-X and PGA-C (obtained from The Sherwin-Williams Co., Chicago, Ill.).

Suitable polyglycidyl adducts derived from amino alcohols include O,N,N-triglycidyl-4-aminophenol, available as Araldite 0500 or Araldite 0510 (obtained from Ciga Geigy Corporation). Also, O,N,N-triglycidyl-3-aminophenol may be used.

Also suitable for use herein are the glycidyl esters of carboxylic acids. Such glycidyl esters include, for example, diglycidyl phthalate, diglycidyl terephthalate, diglycidyl isophthalate, and diglycidyl adipate. There may also be used polyepoxides such as triglycidyl cyanurates and isocyanurates, N,N-diglycidyl oxamides, N,N'-diglycidyl derivatives of hydantoins such as "XB 2793" (obtained from Ciba Geigy Corporation), diglycidyl esters of cycloaliphatic dicarboxylic acids, and polyglycidyl thioethers of polythiols.

Other epoxy-containing materials are copolymers of acrylic acid esters of glycidol such as glycidyl acrylate and glycidyl methacrylate with one or more copolymerizable vinyl compounds. Examples of such copolymers are 1:1 styrene-glycidyl methacrylate, 1:1 methyl methacrylate-glycidyl acrylate and 62.5:24:13.5 methyl methacrylate:ethyl acrylate:glycidyl methacrylate.

Silicone resins containing epoxy functionality, e.g., 2,4,6,8,10-pentakis[3-(2-epoxypropoxy)propyl]-2,4,6,8,10-pentamethylcyclopentasiloxane and the diglycidyl ether of 1,3-bis-(3-hydroxypropyl)tetramethyldisilixane are also usable.

The preferred coepoxides are diglycidyl ether of bisphenol A, N,N,N',N'-tetraglycidylxylylene diamine, O,N,N-triglycidyl-3-aminophenol, O,N,N-triglycidyl-4-aminophenol, glycidyl glycidate, N,N-diglycidyl aniline and N,N-diglycidyl toluidine as the resin component. In practice the preferred coepoxides are employed in an amount from about 10 to about 20 weight % of the total epoxide content.

The compositions of the present invention may additionally contain an accelerator to increase the rate of cure of the epoxy plus amine reaction. Accelerators which may be used herein include Lewis acids; amine complexes, such as BF$_3$.mono-ethylamine, BF$_3$.piperdine. BF$_3$.2-methylimidazole; amines, such as imidazole and its derivatives, such as 4-ethyl-2-methylimidazole, 1-methylimidazole, 2-methylimidazole; N,N-dimethylbenzylamine; acid salts of tertiary amines, such as the p-toluene sulfonic acid:imidazole complex, salts of trifluoro methane sulfonic acid, such as FC-520 (obtained from 3M Company), organophosphonium halides and dicyandiamide.

The cure accelerators also include 1,3,5-trihydroxybenzene (phlorgoglucinol); 1,2,3,-trihydroxybenzene (pyrogallol); and C$_1$ to C$_{12}$ alkyl derivatives thereof; the aryl derivatives thereof containing up to 12 carbon atoms in the aryl group such as the phenyl, benzyl and tolyl derivatives; hydrates such as phloroglucinol dihydrate; the C$_1$ to C$_{12}$ alkyl esters of gallic acid (3,4,5-trihydroxybenzoic acid), such as methyl gallate, ethyl gallate, n-propyl gallate, butyl gallate, etc.; the aryl esters of gallic acid wherein the aryl group contains up to 12 carbon atoms such as phenyl gallate benzyl gallate and tolyl gallate; phenones, such as 2,4,6-trihydroxy acetophenone, 2,3,4-trihydroxy acetophenone and 2,3,4-trihydroxybenzophenone; the various N-C$_1$ to C$_{12}$ alkyl amides of gallic acid; the N-aryl amides of gallic acid wherein the aryl group contains up to 12 carbon atoms, such as the N-phenyl, N-benzyl and N-tolyl amides of gallic acid; the (3,4,5-trihydroxyphenyl)-C$_1$ to C$_{12}$ alkyl sulfones, and the aryl analogs thereof wherein the aryl group contains up to 12 carbon atoms; and the corresponding sulfonamide analogs. Preferred cure accelerators comprise the various positional isomers of trihydroxy benzene, the hydrates thereof and the C$_1$ to C$_{12}$ alkyl esters of gallic acid, of which phloroglucinol, n-propyl gallate and pyrogallol are particularly preferred.

If used, the accelerator may be from 1 to 6 percent and more preferably from 1 to 3 percent by weight of the epoxy component.

The compositions of this invention may also include modifiers which increase the modulus of cured epoxy resins. Examples of such modifiers include antiplasticizers such as dibutylphthalate, phenol adducts of bisphenol A epoxy resins, polyhalogenated biphenyls, azobenzene, hydroxy diphenyl, tricresyl, phosphate; fortifiers such as the various reaction products between a substituted aromatic amine or amide and a monoepoxide or diepoxide described by P. D. McLean et al in *The British Polymer Journal*, Volume 15, March 1983, pages 66–70, which is hereby incorporated by reference and relied on in its entirety; as well as such other modifiers as are known to those skilled in the art.

Preferred modifiers for use in the compositions of this invention comprise the fortifiers described in U.S. Pat. No. 4,480,082. These fortifiers comprise the reaction product of (i) an aromatic amide having the amine group of the amide attached to an aromatic ring, and (ii) a mono- or di-epoxide. A particularly preferred fortifier of this type comprises the reaction product of phenyl glycidyl ether and 4-hydroxyacetanilide. This material is available commercially from Uniroyal Canada (Guelph, Ontario, Canada) as "Fortifier I", and contains approximately 80 to 98 percent by weight of adducts of 4-hydroxyacetanilide and phenyl glycidyl ether (1:4.3 molar ratio), 0 to 12 percent unreacted phenyl glycidyl ether and 0 to 8 percent unreacted 4-hydroxyacetanilide. The epoxy equivalent weight of Fortifier I is greater than or equal to 900 g/mole.

Also preferred is "Fortifier C", also available from Uniroyal Canada, which comprises the reaction product of aniline and vinylcyclohexene dioxide.

In practice, the modifier is utilized in an amount of from about 10 to 40% and preferably from 10–20 weight percent based on the total wt. % epoxy content.

The compositions of this invention may optionally contain a thermoplastic polymer. These materials have beneficial effects of the viscosity and film strength characteristics of the epoxy/hardener/accelerator mixture when composite is prepared by hot melt preferring process.

The thermoplastic polymers used in this invention include polyarylethers of the following formula which are described in U.S. Pat. Nos. 4,108,837 and 4,175,175, wherein $R_3$ is a residuum

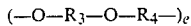

of a dihydric phenol such as bisphenol A, hydroquinone, resorcinol, 4,4-biphenol, 4,4′-dihydroxydiphenyl sulfone, r,r′-dihydroxy-3,3′,5,5′-tetramethyldiphenyl sulfide, 4,4′-dihydroxy-3,3′,5,5′-tetra methyldiphenyl sulfone and the like. $R_4$ is a residuum of a benzenoid compound susceptible to nucleophilic aromatic substitution reactions such as 4,4′-dichlorodiphenyl sulfone, 4,4′-difluorobenzophenone, and the like. The average value of e is from about 8 to about 120.

These polymers may have terminal groups which react with epoxy resins, such as hydroxyl or carboxyl, or terminal groups which do not react.

Other suitable polyarylethers are described in U.S. Pat. No. 3,332,209.

Also suitable are polyhydroxyethers of the formula:

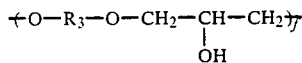

where $R_3$ has the same meaning as previously noted and the average value of f is between about 8 and about 300; and polycarbonates such as those based on bisphenol A, tetramethyl bisphenol A, 4,4′-dihydroxydiphenyl sulfone, 4,4′-dihydroxy-3,3′,5,5′-tetramethyldiphenyl sulfone, hydroquinone, resorcinol, 4,4′-dihydroxy-3,3′,5,5′-tetramethyldiphenyl sulfide, 4,4′-biphenol, 4,4′-dihydroxydiphenyl sulfide, phenolphthalein, 2,2,4,4-tetramethyl-1,3-cyclobutane diol, and the like. Other suitable thermoplastics include poly(epsilon-caprolactone); polybutadiene; polybutadiene/acrylonitrile copolymers, including those optionally containing amine, carboxyl, hydroxyl, or —SH groups, polyesters, such as poly(butylene terephthalate); poly(ethylene terephthalate); polyetherimides such as the Ultem resins (obtained from the General Electric Company); acrylonitrile//butadiene/styrene terpolymers, polyamides such as nylon 6, nylon 6,6, nylon 6,12, and Trogamid T (obtained from Dynamite Nobel Corporation); poly(amide imides) such as Torlon poly(amide imide) (obtained from Amoco Chemical Corporation, Napierville, IL); polyolefins; polyethylene oxide; poly(butyl methacrylate); impact-modified polystyrene; sulfonated polyethylene; polyarylates such as those derived from bisphenol A and isophthalic and terephthalic acid; poly(2,6-dimethyl phenylene oxide); polyvinyl chloride and its copolymers; polyacetals; polyphenylene sulfide and the like. The preferred thermoplastic polymers for use in this invention include the polyhydroxyethers, polyetherimides and the polyarylethers.

In the compositions of this invention, the aromatic diamine hardener is employed in an amount sufficient to provide from about 0.4 to 2.0, preferably from about 0.6 and 1.9, and most preferably from 0.7 to 1.7 equivalents of amine N—H per equivalent of epoxy group in the epoxy resin. When a cure accelerator containing hydroxyl groups is used, the amount if sufficient to provide from 0.01 to 0.35, preferably 0.03 to 0.3, and most preferably 0.04 to 0.25 equivalents of hydroxy groups per equivalent of epoxy groups in the resin. Typical formulations within these ranges will comprise from 0.1 to 10, preferably from 0.5 to 7, and most preferably from about 1 to 3 percent by weight of the cure accelerator. When a thermoplastic polymer is to be included in the composition, the amount thereof comprises up to about 20%, and preferably less than 15 percent by weight. The modifier, when employed, comprises up to about 35, and preferably less than 30 percent by weight. For the purpose of the foregoing, all weights are calculated based on the combined weight of resin, hardener, cure accelerator, modifier (when present) and thermoplastic polymer (when present), which are collectively referred to herein as the "resinous portion of the composite".

As indicated the compositions of this invention contain as component (c) at least one structural fiber. The structural fibers which are useful in this invention include carbon, graphite, glass, silicon carbide, poly(benzothiazole), poly(benzimidazole), poly(benzoxazole), alumina, titania, boron, and aromatic polyamide.

These fibers are characterized by a tensile strength of greater than 100,000 psi, a tensile modulus of greater than two million psi, and a decomposition temperature of greater than 200° C. The fibers may be used in the form of continuous tows (1,000 to 400,000 filaments each), woven cloth, whiskers, chopped fiber or random mat. The preferred fibers are carbon or graphite fibers, aromatic polyamide fibers such as Kevlar 49 fiber (obtained from E. I. duPont de Nemours, Inc., Wilmington, DE), and silicon carbide fibers.

The structural fiber is included in the compositions of this invention in an amount up to 85, generally from 20 to 80, and preferably from 30 to 80 percent by weight of the total composition, i.e., the combined weight of structural fiber plus the resinous portion of the composite.

A particularly preferred formulation from use in the preparation of composite materials by wet winding process comprises, as the resinous portion of the composite, bis(2,3-epoxycyclopentyl)ether and the aromatic diamine as defined in (b) in an amount sufficient to provide from 0.6 to 1.9 amine N—H group per equivalent of epoxy group.

Composite articles may be prepared by wet winding. In wet winding, a continuous tow of reinforcement is passed through a resin bath containing a mixture of the epoxide and the amine hardener, and optionally, the accelerator, modifier and thermoplastic polymer. After the tow is impregnated with resin, it is passed through squeeze rolls to remove excess resin. It is therefore important for wet winding operations that the resin bath have a viscosity of less than about 2000 cps at room temperature and be sufficiently stable so that the resin system impregnated on the tow does not cure prematurely. In practice, it is desirable that the resin bath be stable for a minimum of 8 hours and preferably up to 48 hours before any room temperature increase in viscosity commences. As previously indicated, the epoxy resin systems of this invention have a viscosity of less than 2000 cps and exhibit good stability at room temperature and hence allow sufficient time for processing.

EXAMPLES

The following examples serve to give specific illustrations of the practice of this invention but they are not intended in any to limit the scope of this invention.

Unreinforced castings were prepared having the composition indicated in the following examples and controls in accordance with accepted procedures, and the initial viscosities and physical properties after preparation of the castings are set forth in Table I below.

CONTROL A

A thermosetting epoxy resin formulation was prepared by blending 100 g of bis(2,3-epoxycyclopentyl) ether with 29 g of meta-phenylene diamine (MPDA). This mixture had an NH/epoxide stoichiometry of 1.0.

CONTROL B

A thermosetting epoxy resin formulation was prepared by combining 100 g of bis(2,3-epoxycyclopentyl) ether with 54 g of 4,4'diaminediphenyl methane (MDA) at 55°–60° C. This mixture had an NH/epoxide stoichiometry of 1.0.

TABLE I

| | NEAT RESIN PROPERTIES | | | | |
|---|---|---|---|---|---|
| | Control A | Control B | Example 1 | Example 2 | Control C[c] |
| Components [b] (pbw) | ERR-4205 (100) MPDA (29) | ERR-4205 (100) MDA (54) | ERR-4205 (50) Bisaniline-M (47) | ERR-4205 (50) TPE-R (40) | ERR-4205 (100) SED-M (118) |
| Initial Brookfield Viscosity (cps) @ 26° C. for Epoxy/Amine Homogeneous Mixture | 83 | 160 | 1300 | 1100 | 160,000 |
| Casting Properties | | | | | |
| Water Uptake [a] (%) (2 week soak at 160° F.) | 12.0 | 6.4 | 3.2 | 3.0 | Too Brittle to test |
| Tg [d] (°C.) | 208 | 200 | 173 | 190 | |
| Tensile Strength (ksi) | 16.8 | 15.5 | 12.9 | 14.3 | |
| Modulus (ksi) | 650 | 534 | 540 | 490 | |
| Elongation (%) | 3.7 | 5.7 | 3.2 | 5.4 | |

Cure Schedule: 100° C. (5 hr); 179° C. (2 hr). Heating Rate 1° C./min.
Tensile Properties by ASTM D-638 Using a type I dogbone specimen
[a] Specimen Size: 2.5" × 0.4" × 0.12"
[b] NH/epoxide (mole ratio): 1.0
[c] SED-M: [4,4'-bis(3-aminophenoxy diphenyl sulfone]. This diamine has been describe in the prior art (U.S. Pat. No. 4,517,321 1985.)
[d] Dupont DMA-982 (E" max). Heating Rate 5 deg/min.

EXAMPLE 1

A thermosetting epoxy resin formulation was prepared by blending 50 g of bis(2,3-epoxycyclopentyl) ether with 47 g of 4,4'[1,3-phenylene bis(1-methylethylidene)] (Bisaniline-M, Mitsui Petrochemicals, Japan) at 100°–110° C. This mixture had an NH/epoxide stoichiometry of 1.0.

EXAMPLE 2

A thermosetting epoxy resin formulation was prepared by blending 50 g of bis(2,3-epoxycyclopentyl) ether with 40 g of 1,3-bis(4-aminophenoxy)benzene (TPE-R, Wakayama Seika, Japan) at 100°–105° C. This mixture has an NH/epoxide stoichiometry of 1.0.

CONTROL C

A thermosetting epoxy resin formulation was prepared by blending 100 g of bis(2,3-epoxycyclopentyl) ether with 118 g of 4,4'-bis(3-amino-phenoxy) diphenyl sulfone (SED-M) at 100° C. This mixture had an NH/epoxide stoichiometry of 1.0.

In similar manner, unreinforced castings were prepared having the composition indicated in the following controls and examples, and the properties set forth in Table II.

CONTROL D

A thermosetting resin formulation was prepared by combining 100 g of vinylcyclohene diepoxide (ERL-4206) with 38.6 g of MPDA at 50°–60° C. This mixture had an NH/epoxide stoichiometry of 1.0.

CONTROL E

A thermosetting resin formulation was prepared by blending 100 g of ERL-4206 with 70.6 g of MDA at 70°–80° C. This mixture had an NH/epoxide stoichiometry of 1.0.

EXAMPLE 3

A thermosetting resin formulation was prepared by mixing 50 g of ERL-4206 with 61 g Bisaniline-M at 100°–105° C. This mixture had an NH/epoxide stoichiometry of 1.0.

TABLE II

| | NEAT RESIN PROPERTIES | | | |
|---|---|---|---|---|
| | Control D | Example 3 | Example 4 | Control E |
| Components (pbw) | ERL-4206 (100) MPDA (38.6) | ERL-4206 (50) Bisaniline-M (61) | ERL-4206 (50) TPE-R (52) | ERL-4206 (100) MDA (70.6) |
| Initial Viscosity (cps) @ 26° C. | 25 | 330 | 220 | 100 |
| Casting Properties | | | | |
| Water Uptake (%) (2 week soak at 160° F.) | 8.3 | 2.3 | 3.1 | 4.5 |
| Tg (a) (°C.) | 213 | 162 | 168 | 192 |

Cure Schedule: 100° C. (5 hr); 170° C. (2 hr). Heating Rate 1° C./min
(a) Dupont DMA-982 (E" max). Heating Rate 5° C./min.

The unreinforced castings based on components (a) and (b) of this invention display lower wateruptake than other low viscosity systems based on conventional hardeners, MPDA and MDA. The compositions of this invention afford low viscosity which is appropriate for making composite articles by a wet winding process. These compositions also possess high Tg and excellent tensile properties.

EXAMPLE 4

A thermosetting resin formulation was prepared by blending 50 g of ERL-4206 with 52 of TPE-R. This mixture had an NH/epoxide stoichiometry of 1.0.

Although the invention has been illustrated by the foregoing examples, it is not to be construed as being limited to the materials employed therein, but rather, the invention relates to the generic area as hereinbefore disclosed. Various modifications and embodiments thereof can be made without departing from the spirit and scope thereof.

What is claimed is:

1. A curable, thermosetting resin composition consisting essentially of:
   (a) at least one cycloaliphatic epoxy resin containing at least two 1,2-epoxy groups per molecule:
   (b) at least one aromatic diamine hardener in an amount sufficient to provide from about 0.4 to about 2.0 equivalents of amine N—H per equivalent of 1,2-epoxy group in the epoxy resin, said diamine hardener having the following formula:

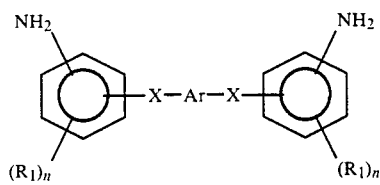

wherein Ar represents a single or fused aromatic nucleus of up to 10 carbon atoms, which optionally may contain one or more R and $R_1$ substituents; X represents O, S,

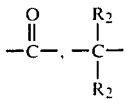

or a single bond; R and $R_1$ individually represent alkyl of from 1–12 carbon atoms or halogen groups; $R_2$ represents hydrogen or an alkyl group of from 1–12 carbon atoms; and n has a value of from 0 to 4; and wherein (a) and (b) have a viscosity as measured at 25° C. of no greater than 2000 cps; and
   (c) a structural fiber.

2. The curable composition of claim 1 wherein the aromatic diamine hardener of the indicated formula is the sole diamine hardener present in the epoxy resin composition.

3. The curable composition of claim 1 wherein the cycloaliphatic epoxy resin is present in an amount such that the viscosity of said composition is less than about 2000 cps.

4. The curable composition of claim 2 wherein Ar of the aromatic diamine hardener is phenylene.

5. The curable composition of claim 2 wherein Ar of phenylene, R represents halogen, and X is isopropylidene.

6. The curable composition of claim 2 wherein the aromatic diamine hardener is:

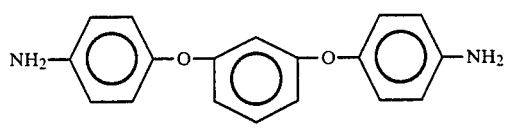

7. The curable composition of claim 1 wherein the aromatic diamine hardener is:

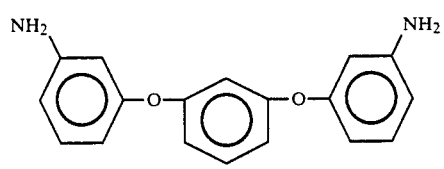

8. The curable composition of claim 1 wherein the aromatic diamine hardener is:

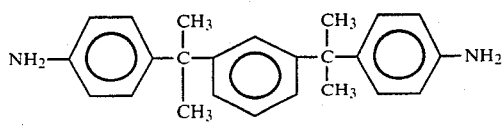

9. The curable composition of claim 1 wherein the aromatic diamine hardener is:

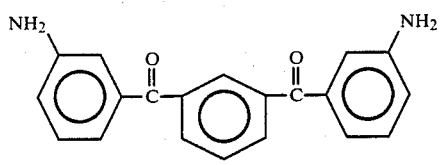

10. The curable composition of claim 1 wherein the aromatic diamine hardener is:

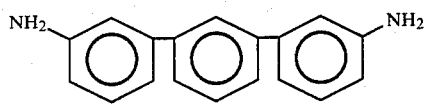

11. The composition of claim 1, wherein the cycloaliphaic epoxide is bis(2,3-epoxycyclopentyl) ether.

12. The composition of claim 1, wherein the cycloaliphatic epoxide is vinylcyclohexene diepoxide, 2-(3,4-epoxycyclohexyl-5,5-spiro-3,4-epoxy) cyclohexane meta-dioxane, 3,4-epoxycyclohexyl-methyl 3,4-epoxycyclohexane carboxylate, 3,4-epoxy-6-methylcyclohexylmethyl 3,4-epoxy-6-methylcyclohexane carboxylate, dipentene dioxide, bis(3,4-epoxy)cyclohexylmethyl) adipate or mixtures thereof.

13. The composition of claim 1, further comprising up to 40 percent by weight of a coepoxy resin.

14. The composition of claim 13, wherein the co-epoxy resin is selected from one or more of the following:

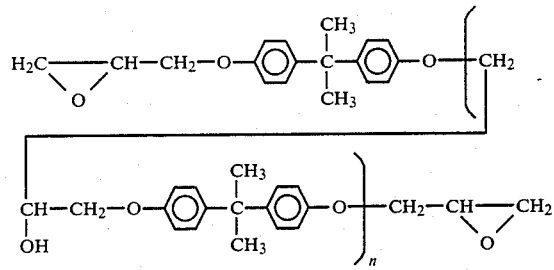

wherein n is from 0 to about 15;

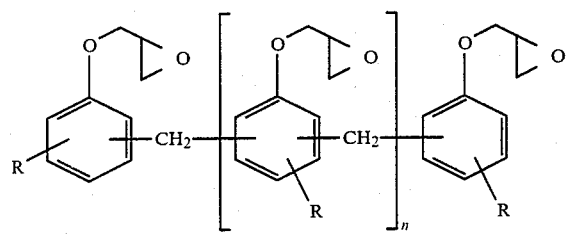

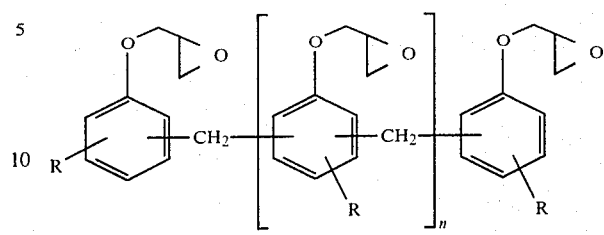

wherein n is from 0.1 to about 8 and R is CH₃.

15. The composition of claim 1, further comprising up to 35% by weight of a modifier which increases the modulus of the epoxy resin.

16. The composition of claim 1 wherein said structural fiber has a tensile strength of greater than about 1,000,000 psi, a tensile modulus of greater than about two million psi, and a decomposition temperature of greater than about 200° C.

17. The composition of claim 16, wherein said structural fiber is selected from the group consisting of from carbon, graphite, glass, silicon carbide, poly[benzothiazole), poly(benzimidazole), poly(benzoxazole), alumina, titania, boron, aromatic polyamides, and mixtures thereof.

18. The composition of claim 1 in the form of a composite.

19. A composite material consisting essentially of:
(a) a cycloaliphatic epoxide resin containing at least two 1,2-epoxy groups per molecule;
(b) at least one aromatic diamine hardener in an amount sufficient to provide from about 0.4 to about 2.0 equivalents of amine N—H per equivalent of 1,2-epoxy group in the epoxy resin, said diamine hardener having the following formula:

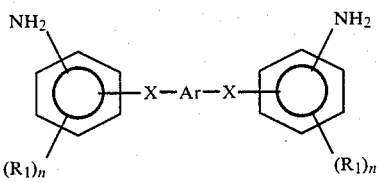

wherein Ar represents a single or fused aromatic nucleus of up to 10 carbon atoms, which optionally may contain one or more R and R₁ substituents; X represents O, S,

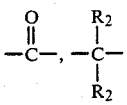

or a single bond; R and R₁ individually represent alkyl of from 1-12 carbon atoms or halogen groups; R₂ represents hydrogen or an alkyl group of from 1-12 carbon atoms; and n has a value of from 0 to 4; and wherein (a) and (b) have a viscosity as measured at 25° C. of no greater than 2000 cps.
(c) an aromatic trihydroxy cure accelerator selected from the group consisting of phloroglucinol, n-propyl gallate, pyrogallol and mixtures thereof in an amount sufficient to provide from about 0.01 to about 0.34 equivalents of hydroxy per equivalent of 1,2-epoxy group in the epoxide resin; and (d) up to about 85% by weight, based on the total weight of the composition, of a structural fiber having a tensile strength of greater than about 100,000 psi, a tensile modulus of greater than about two million psi, and a decomposition temperature of greater than about 200° C.

20. The composite of claim 19, wherein the cycloaliphatic epoxide is bis(2,3-epoxycyclopentyl) ether.

21. The composite of claim 19, wherein the cycloaliphatic epoxide is vinylcyclohexene diepoxide, 2-(3,4-epoxycyclohexyl-5,5-spiro-3,4-epoxy) cyclohexane meta-dioxane, 3,4-epoxycyclohexylmethyl 3,4-epoxycyclohexane carboxylate, 3,4-epoxy-6-methylcyclohexylmethyl 3,4-epoxy-6-methylcyclohexane carboxylate, dipentene dioxide, bis(3,4-epoxycyclohexylmethyl) adipate or mixtures thereof.

22. The composite of claim 19, further comprising up to about 30 percent by weight of a coepoxy resin, based on the combined weight of the cycloaliphatic epoxide resin and the coepoxy resin.

* * * * *